US012236687B2

(12) United States Patent
Salter et al.

(10) Patent No.: US 12,236,687 B2
(45) Date of Patent: Feb. 25, 2025

(54) VEHICLE EXTERIOR IMAGING SYSTEMS

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); David Brian Glickman, Southfield, MI (US); Keith Hoelscher, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/308,837

(22) Filed: Apr. 28, 2023

(65) Prior Publication Data

US 2023/0267748 A1    Aug. 24, 2023

Related U.S. Application Data (63) Continuation of application No. 16/659,713, filed on Oct. 22, 2019, now Pat. No. 11,682,216.

(51) Int. Cl.
*G06K 9/00* (2022.01)
*B32B 17/10* (2006.01)
(Continued)

(52) U.S. Cl.
CPC ........ *G06V 20/56* (2022.01); *B32B 17/10036* (2013.01); *B60R 1/25* (2022.01);
(Continued)

(58) Field of Classification Search
CPC ...... B60K 2370/1529; B60K 2370/785; B60K 35/00; B60K 2370/152; B60K 2370/165;
(Continued)

(56) References Cited

U.S. PATENT DOCUMENTS

| 7,924,146 B2 | 4/2011 | Seder et al. |
| 9,908,472 B2 | 3/2018 | Wippler |

(Continued)

FOREIGN PATENT DOCUMENTS

DE    202016000640 U1    5/2017

OTHER PUBLICATIONS

Head-Up Display Solutions: Automotive Experience / 3M-US; 3M Science. Applied to Life; six pages; https://www.3m.com/3M/en-US/oem-tier-us/applications/human-machine-interface-solutions/ . . .

*Primary Examiner* — Alex Kok S Liew
(74) *Attorney, Agent, or Firm* — Vichit Chea; Carlson, Gaskey & Olds, P.C.

(57) ABSTRACT

This disclosure relates to vehicle exterior imaging systems that capture and display views of the exterior environment to vehicle operators. An exemplary vehicle exterior imaging system may include a glass panel including a combiner positioned between a first layer of glass and a second layer of glass, a first exterior side-view imager assembly configured to capture images of a vehicle exterior environment, and a projector assembly configured to project an output image onto the glass panel. The output image is based on the images captured by the first exterior side-view imager assembly. The glass panel may be part of either a windshield or a door window, and the projector assembly may be mounted either outside or inside of a housing of the first exterior side-view imager assembly.

20 Claims, 5 Drawing Sheets

(51) Int. Cl.
*B60R 1/25* (2022.01)
*B60R 1/26* (2022.01)
*B60R 11/04* (2006.01)
*G01S 13/86* (2006.01)
*G02B 27/01* (2006.01)
*G06V 20/56* (2022.01)
*H04N 23/698* (2023.01)

(52) U.S. Cl.
CPC .............. *B60R 1/26* (2022.01); *B60R 11/04* (2013.01); *G01S 13/867* (2013.01); *G02B 27/0101* (2013.01); *H04N 23/698* (2023.01); *B60K 2360/334* (2024.01)

(58) Field of Classification Search
CPC ........ B60K 2370/175; B60K 2370/193; B60K 2370/31; B60K 2370/66; B60K 2370/178; B60K 2370/179; B60K 2370/194; B60K 2370/23; B60K 2370/334
See application file for complete search history.

(56) References Cited

U.S. PATENT DOCUMENTS

| | | |
|---|---|---|
| 10,017,114 B2 | 7/2018 | Bongwald |
| 2015/0232030 A1* | 8/2015 | Bongwald .......... G02B 27/0101 348/115 |
| 2015/0298598 A1* | 10/2015 | Nüssli .................. H04N 9/3147 345/2.2 |
| 2016/0297362 A1 | 10/2016 | Tijerina et al. |
| 2017/0210282 A1* | 7/2017 | Rodriguez Barros . B60Q 1/324 |
| 2018/0111554 A1* | 4/2018 | Pearce ................. G08G 1/0112 |
| 2019/0066510 A1* | 2/2019 | Salter .................... B60Q 1/543 |

\* cited by examiner

VEHICLE EXTERIOR IMAGING SYSTEMS

CROSS-REFERENCE TO RELATED APPLICATION

This is a continuation of U.S. patent application Ser. No. 16/659,713, filed on Oct. 22, 2019, the entirety of which is incorporated herein by reference.

TECHNICAL FIELD

This disclosure relates to vehicle exterior imaging systems that capture and display views of the exterior environment to vehicle operators.

BACKGROUND

Motor vehicles have traditionally included side-view mirrors that provide reflective surfaces for allowing a vehicle operator to visualize other vehicles that are approaching from the rear and sides of the vehicle. In more recent years, some vehicles have been equipped with cameras for capturing images of the vehicle external environment.

SUMMARY

A vehicle exterior imaging system according to an exemplary aspect of the present disclosure includes, among other things, a glass panel including a combiner positioned between a first layer of glass and a second layer of glass, a first exterior side-view imager assembly configured to capture images of a vehicle exterior environment, and a projector assembly configured to project an output image onto the glass panel. The output image is based on the images captured by the first exterior side-view imager assembly.

In a further non-limiting embodiment of the foregoing system, the glass panel is part of a windshield.

In a further non-limiting embodiment of either of the foregoing systems, the glass panel is part of a window of a vehicle door.

In a further non-limiting embodiment of any of the foregoing systems, the combiner includes at least one layer of a combiner film that is sandwiched between a first and a second layer of polyvinyl butyral (PVB).

In a further non-limiting embodiment of any of the foregoing systems, the first exterior side-view imager assembly is a driver-side imager that includes a first camera for capturing the images.

In a further non-limiting embodiment of any of the foregoing systems, a second exterior side-view imager assembly is a passenger-side imager that includes a second camera for capturing additional images of the vehicle exterior environment.

In a further non-limiting embodiment of any of the foregoing systems, the first exterior side-view imager assembly is mounted to a vehicle door.

In a further non-limiting embodiment of any of the foregoing systems, the first exterior side-view imager assembly is mounted forward of a vehicle A-pillar.

In a further non-limiting embodiment of any of the foregoing systems, the projector assembly is mounted to a vehicle instrument panel located inside a vehicle passenger cabin.

In a further non-limiting embodiment of any of the foregoing systems, the projector assembly is mounted inside a housing of the first exterior side-view imager assembly.

In a further non-limiting embodiment of any of the foregoing systems, a mirror is movably mounted inside the housing and is configured to reflect light emitted from the projector assembly so that the light passes through an opening of the housing and then onto the glass panel.

In a further non-limiting embodiment of any of the foregoing systems, the output image is projected onto a lower corner section of the glass panel at a location that is inboard of a vehicle A-pillar.

In a further non-limiting embodiment of any of the foregoing systems, a controller is configured to receive the images captured by the first exterior side-view imager assembly and then process the images to create the output image.

In a further non-limiting embodiment of any of the foregoing systems, the controller is configured to command a light source of the projector assembly to project the output image onto the glass panel.

In a further non-limiting embodiment of any of the foregoing systems, the controller is configured to adjust a brightness of the output image based on an ambient light level sensed by a sensor system.

A vehicle according to another exemplary aspect of the present disclosure includes, among other things, a glass panel including a combiner positioned between a first layer of glass and a second layer of glass, a first exterior side-view imager assembly configured to capture a first view of an exterior environment around the vehicle, and a first projector assembly configured to project a first output image onto a first section of the glass panel. The first output image is based on the first view captured by the first exterior side-view imager assembly. A second exterior side-view imager assembly is configured to capture a second view of the exterior environment. A second projector assembly is configured to project a second output image onto a second section of the glass panel. The second output image is based on the images captured by the second exterior side-view imager assembly.

In a further non-limiting embodiment of the foregoing vehicle, the glass panel is a windshield, the first section is a lower, driver-side corner of the windshield, and the second section is a lower, passenger-side corner of the windshield.

In a further non-limiting embodiment of either of the foregoing vehicles, the first projector assembly and the second projector assembly are mounted on top of an instrument panel located within a passenger cabin of the vehicle.

In a further non-limiting embodiment of any of the foregoing vehicles, the first projector assembly is mounted inside a first housing of the first exterior side-view imager assembly and the second projector assembly is mounted inside a second housing of the second exterior side-view imager assembly.

In a further non-limiting embodiment of any of the foregoing vehicles, the combiner includes at least one layer of a combiner film that is sandwiched between a first and a second layers of polyvinyl butyral (PVB).

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to vehicle exterior imaging systems that capture and display views of the exterior environment to vehicle operators. An exemplary vehicle exterior imaging system may include a glass panel including a combiner positioned between a first layer of glass and a second layer of glass, a first exterior side-view imager assembly configured to capture images of a vehicle exterior environment, and a projector assembly configured to project an output image onto the glass panel. The output image is based on the images captured by the first exterior side-view imager assembly. The glass panel may be part of either a windshield or a door window, and the projector assembly may be mounted either outside or inside of a housing of the first exterior side-view imager assembly. These and other features of this disclosure are described in greater detail in the following paragraphs of this detailed description.

Figure 1:
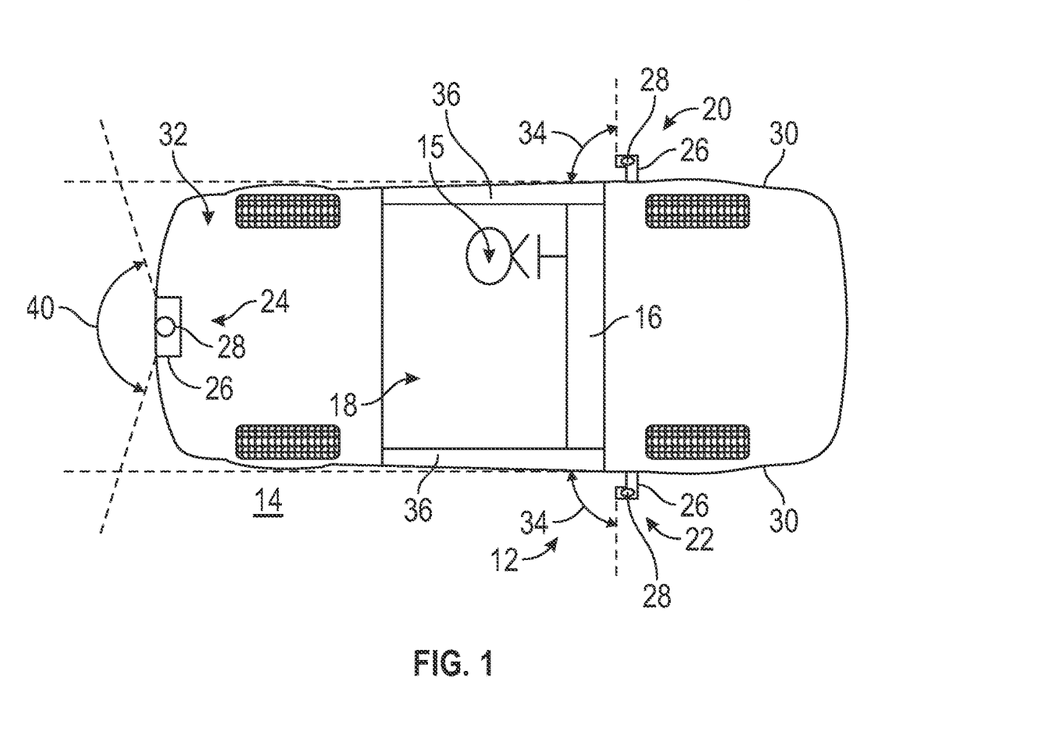
FIG. 1 schematically illustrates a vehicle equipped with an exterior imaging system.
Figure 2:
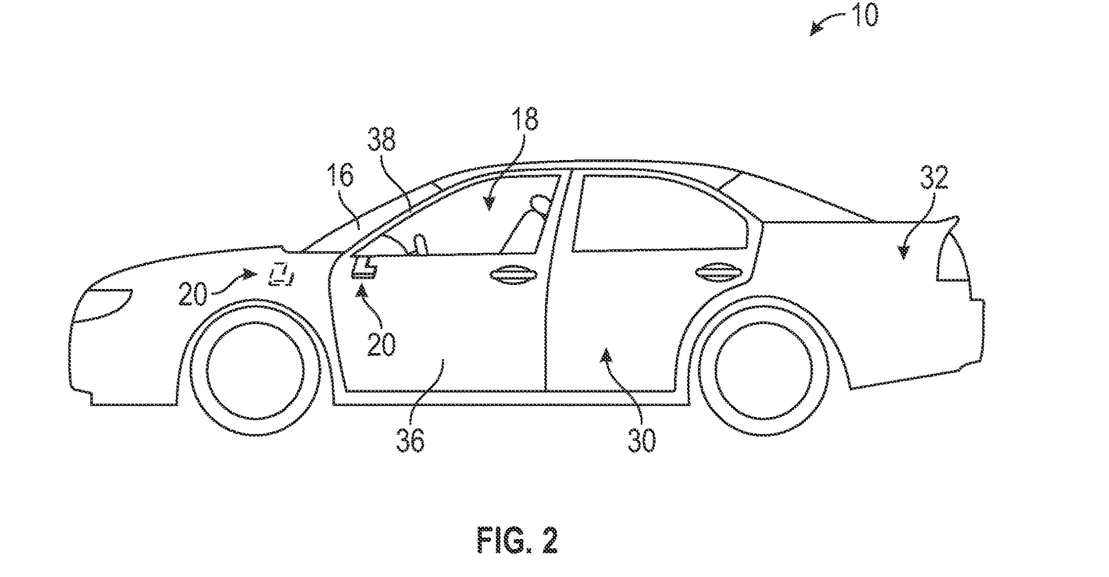
FIG. 2 illustrates exemplary mounting locations of an imager of the exterior imaging system of FIG. 1.

FIGS. 1 and 2 schematically illustrate a vehicle 10. The vehicle 10 may be a car, a truck, a van, a sport utility vehicle, or any other type of motor vehicle. The vehicle 10 could also be a conventional motor vehicle, a battery powered hybrid or electric vehicle, or an autonomous vehicle.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to emphasize certain details of a particular component.

The vehicle 10 includes an exterior imaging system 12 for capturing and displaying images associated with an exterior environment 14 about the vehicle 10. The images captured by the exterior imaging system 12 may be displayed on a windshield (i.e., a windscreen) 16 of the vehicle 10 in order to provide an operator 15 (i.e., a driver) that is located within a passenger cabin 18 of the vehicle 10 with improved visualization of the exterior environment 14. For example, the images may allow the vehicle operator 15 to visualize on-coming traffic approaching from the rear and/or sides of the vehicle 10 without the drawback of blind spots that may be associated with traditional vehicle side-view mirrors.

The exterior imaging system 12 may include at least one driver-side imager 20, at least one passenger-side imager 22, and, optionally, a rear view imager 24. Each of the driver-side imager 20, the passenger-side imager 22, and the rear view imager 24 may include a housing 26 and a camera 28 at least partially mounted within the housing 26. Each housing 26 may include a relatively low profile that provides weight and aerodynamic benefits to the vehicle 10.

The driver-side imager 20 and the passenger-side imager 22 may be mounted at opposing lateral sides 30 of the vehicle 10 and may be referred to as vehicle exterior side-view camera or imager assemblies. In their mounted positions, the driver-side imager 20 and the passenger-side imager 22 face toward a rear portion 32 of the vehicle 10. The driver-side imager 20 and the passenger-side imager 22 may each capture images of the exterior environment 14 within a field of view 34 that is exterior of the passenger cabin 18 of the vehicle 10. In an embodiment, each field of view 34 is about 120 degrees or less. In this disclosure, the term "about" means that the expressed quantities or ranges need not be exact but may be approximated and/or larger or smaller, reflecting acceptable tolerances, conversion factors, measurement error, etc.

In an embodiment, the driver-side imager 20 and the passenger-side imager 22 are mounted to front doors 36 of the vehicle 10. However, alternative mounting locations are contemplated as being within the scope of this disclosure. For example, the driver-side imager 20 and/or the passenger-side imager 22 could be mounted at any location forward of an A-pillar 38 of the vehicle 10 (see, e.g., FIG. 2, which shows an alternative mounting location of the driver-side imager 20 in phantom).

The rear view imager 24 may be mounted within the rear portion 32 of the vehicle 10. The rear view imager 24 may capture images of the exterior environment 14 within a field of view 40. In an embodiment, the field of view 40 is about 170 degrees or less.

Figure 3:
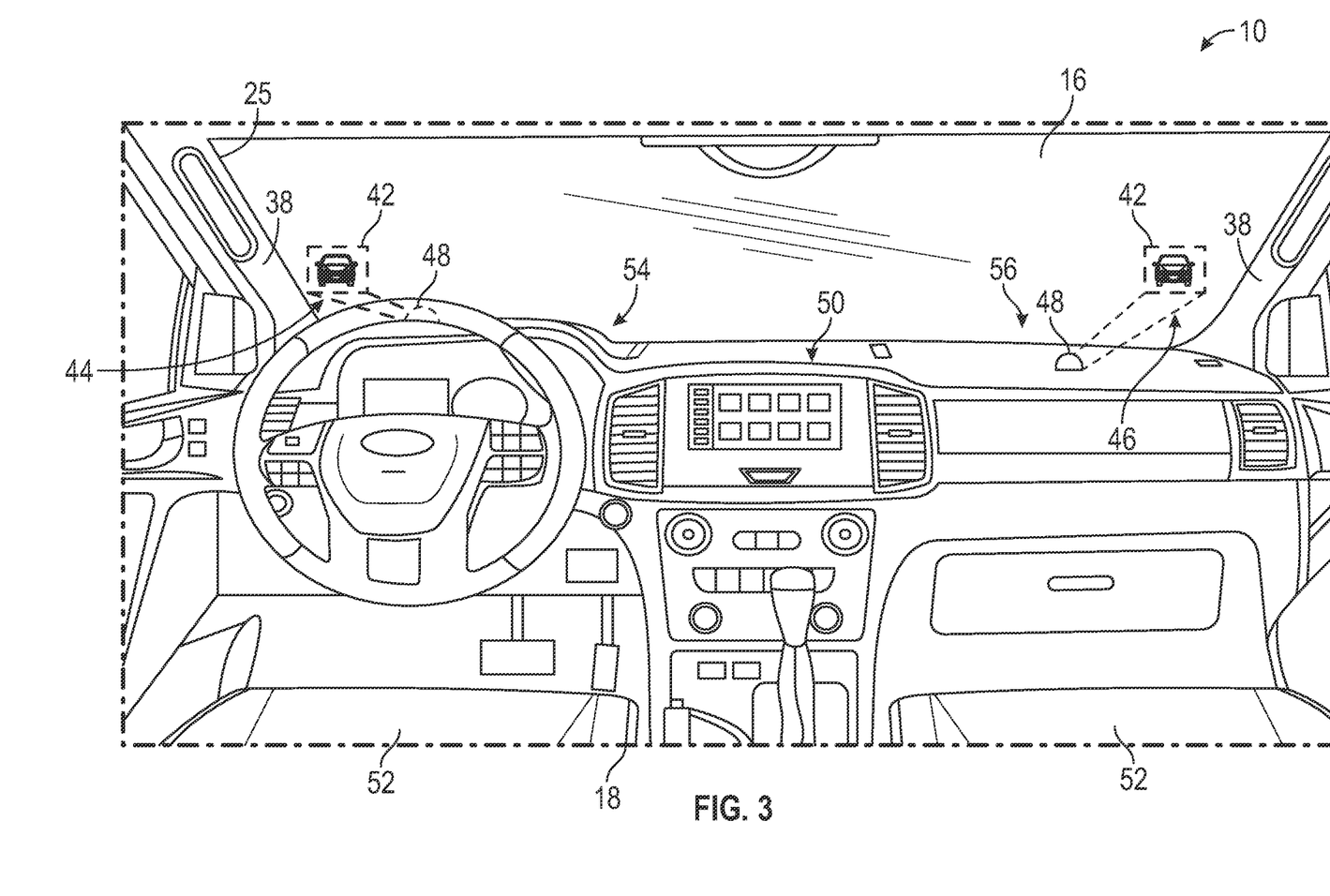
FIG. 3 illustrates select portions of a passenger cabin of the vehicle of FIG. 1.

FIG. 3, with continued reference to FIGS. 1 and 2, shows select portions of the passenger cabin 18 of the vehicle 10 in greater detail. The images captured by the driver-side imager 20 and the passenger-side imager 22 of the exterior imaging system 12 may be displayed as output images 42 on the windshield 16 of the vehicle 10. In an embodiment, the output images 42 are live video streams that provide the operator 15 with real-time views of the exterior environment 14.

The output images 42 may be displayed on the windshield 16 at a location that is inboard of the A-pillars 38 of the vehicle 10. In an embodiment, the images captured by the driver-side imager 20 are displayed as output images 42 near a lower, driver-side corner 44 of the windshield 16, and the images captured by the passenger-side imager 22 are displayed as output images 42 near a lower, passenger-side corner 46 of the windshield 16. In another embodiment, the output images 42 may be displayed slightly inboard (e.g., about 25 mm) from a fret area 25 of the windshield 16. The output images 42 could be displayed at any location of the windshield 16 that does not require the operator 15 to take their eyes of the road while driving forward.

The output images 42 may be projected by one or more projector assemblies 48 of the exterior imaging system 12. In an embodiment, one projector assembly 48 is provided for each imager of the exterior imaging system 12 (i.e., a first projector assembly 48 is dedicated for displaying output images 42 from the driver-side imager 20, a second projector assembly 48 is dedicated for displaying output images 42 from the passenger-side imager 22, etc.).

Each projector assembly 48 may be mounted on top of an instrument panel 50 located within the passenger cabin 18. Therefore, in this embodiment, the projector assemblies 48 are mounted separate from the imagers 20, 22. The instrument panel 50 is generally located between the windshield 16 and seats 52 of the passenger cabin 18. In an embodiment, the projector assembly 48 associated with the driver-side imager 20 is mounted on a driver-side 54 of the instrument panel 50, and the projector assembly 48 associated with the passenger-side imager 22 is mounted on a passenger-side 56 of the instrument panel 50. Other mounting locations of the projector assemblies 48 may also be suitable.

Figure 4:
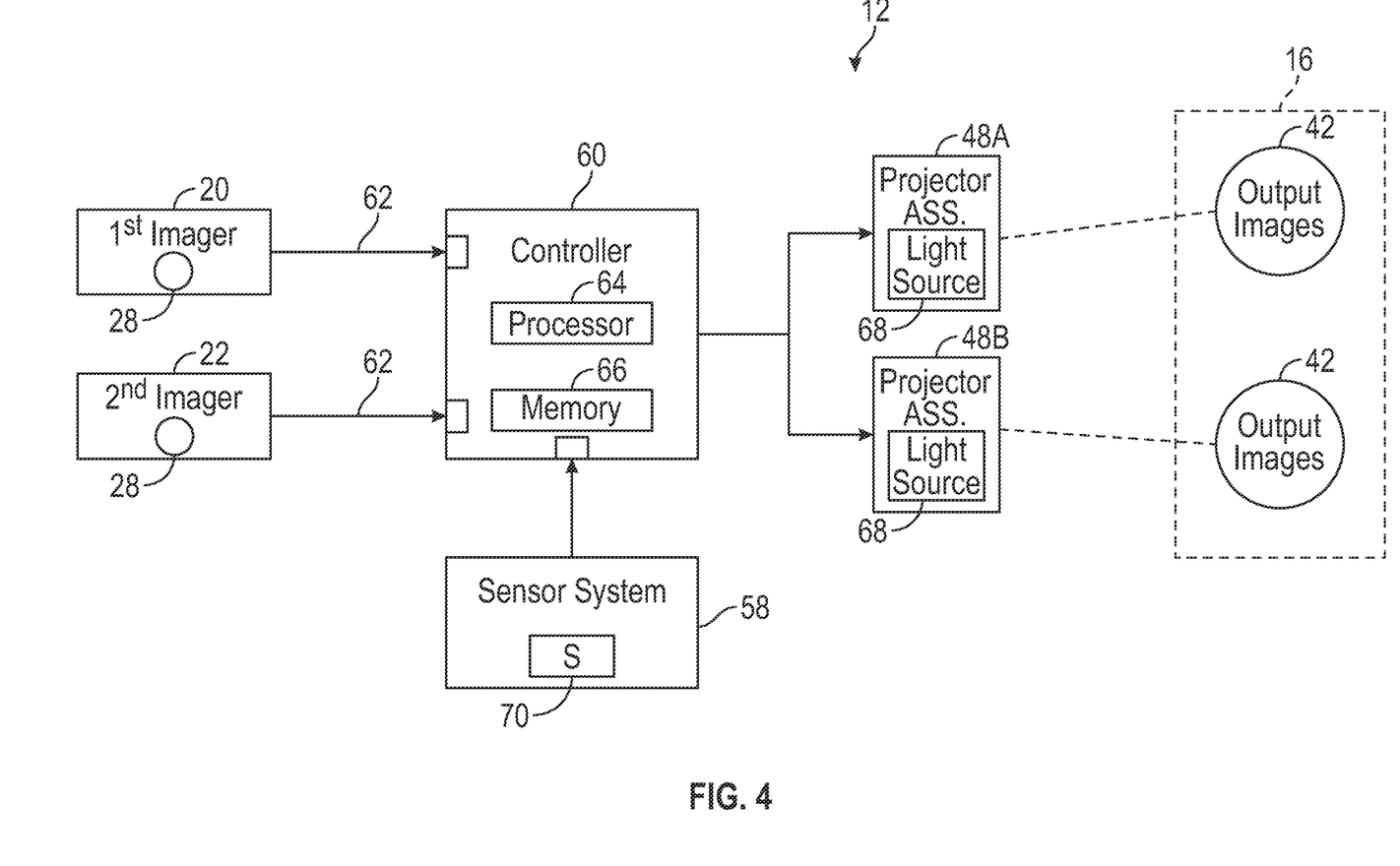
FIG. 4 schematically illustrates an exemplary exterior imaging system for a vehicle.

FIG. 4, with continued reference to FIGS. 1-3, is a block diagram of an exemplary exterior imaging system 12 for a vehicle, such as the vehicle 10 of FIG. 1. The exterior imaging system 12 may include a first imager 20 (e.g., the driver-side imager), a second imager 22 (e.g., the passenger-side imager), a first projector assembly 48A, a second projector assembly 48B, a sensor system 58, and a controller 60.

The first imager 20 and the second imager 22 are each configured for capturing images of the exterior environment 14 surrounding the vehicle 10. In an embodiment, the first and second imagers 20 produce a visual representation around the vehicle 10, e.g., both the driver-side and passenger-side of the vehicle 10, either with or without a rear view. Each of the first and second imagers 20, 22 may include a camera 28 that is capable of capturing the images of the exterior environment 14. Each camera 28 may include a digital imaging device, e.g., a charge-coupled device (CCD) or a complementary metal-oxide semiconductor (CMOS) device.

The image data captured by the cameras 28 may be received as input signals 62 by the controller 60. The controller 60 may control the first and second projector assemblies 48A, 48B to project the output images 42 in response to receiving the input signals 62 from the cameras 28 of the first and second imagers 20, 22.

The controller 60 may include hardware and software, and could be part of an overall vehicle control module, such as a vehicle system controller (VSC), or could alternatively be a stand-alone controller separate from the VSC. Further, the controller 60 may be programmed with executable instructions for interfacing with and operating the various components of the exterior imaging system 12.

The controller 60 additionally includes a processing unit 64 and non-transitory memory 66 for executing the various control strategies and modes of the exterior imaging system 12. The processing unit 64, in an embodiment, is configured to execute one or more programs stored in the memory 66 of the controller 60.

A first exemplary program, when executed, may be employed to process the image data received from the cameras 28 of the first and second imagers 20, 22. This may include, for example, cropping the images so that only a pertinent part of the images are projected onto the windshield 16 as part of the output images 42.

A second exemplary program, when executed, may be employed by the controller 60 in order to command a light source 68 of each projector assembly 48A, 48B to project the output images 42 onto the windshield 16. The output images 42 projected by the light sources 68 are based on the image data processed by the controller 60. The light sources 68 may include light emitting diodes (LEDs), laser LEDs, liquid crystal display (LCD) filters, digital light processing (DLP) projectors, or any combination of these light sources.

In an embodiment, each light source 68 is capable of outputting at least about 40 lumens of light in order to be visible in broad daylight.

A third exemplary program, when executed, may be employed by the controller 60 to control the brightness of the output images 42 that are projected by each of the light sources 68. The controller 60 may be in electronic communication with the sensor system 58. The sensor system 58 may include one or more sensors, such as a light sensor 70 that detects ambient light. In such an example, the controller 60 may issue commands to the light sources 68 of the projector assemblies 48A, 48B, thereby causing the projector assemblies 48A, 48B to change their brightness corresponding to ambient light conditions, such as dimming at night and brightening during the day.

Figure 5:
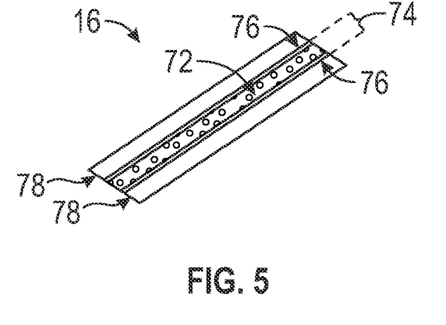
FIG. 5 illustrates an exemplary windshield of a vehicle.

Referring now to FIG. 5, the windshield 16 may include a specialized film for clearly displaying the output images 42 projected by the projector assemblies 48 of the exterior imaging system 12. In an embodiment, the windshield 16 may include a combiner 74 that includes one or more layers of a combiner film 72 that is/are sandwiched between first and second layers of polyvinyl butyral (PVB) 76 to establish the combiner 74. One non-limiting example of a suitable combiner film is the 3M™ Windshield Combiner Film sold by the 3M Company.

The combiner 74 may be sandwiched between layers of glass 78 to form the windshield 16 (or any other glass window of the vehicle 10). The combiner 74 may replace the PVB wedge commonly used within vehicle windshields.

The combiner 74 may serve multiple functions. A first function of the combiner 74 is to increase the image field of view and virtually eliminate secondary images by aligning the images reflected by the layers of glass 78 so passengers at all heights can see a single output image 42 at the correct depth. A second function of the combiner 74 is to reflect both ultraviolet (UV) and infrared (IR) light while polarizing the remaining visible light in order to reduce glare.

Figure 6A:
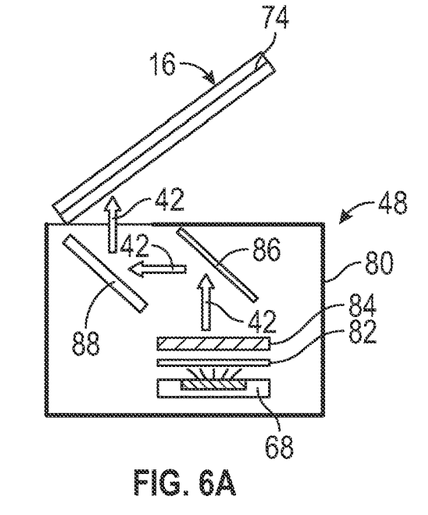
FIGS. 6A and 6B schematically illustrate operation of a projector assembly of the exterior imaging system of FIG. 4. The projector assembly projects output images onto a windshield of the vehicle for displaying views of the vehicle exterior environment.
Figure 6B:
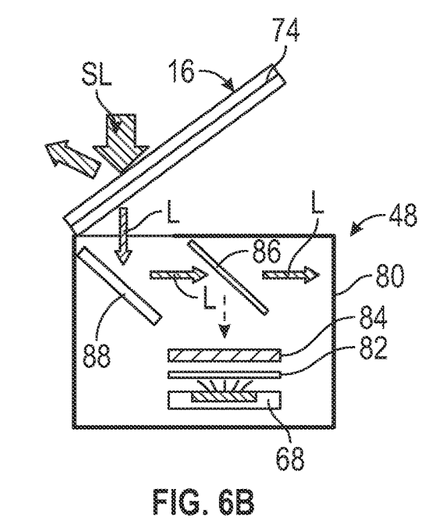

FIGS. 6A and 6B detail an exemplary projector assembly 48 that may be utilized by the exterior imaging system 12 described above. The projector assembly 48 may include a housing 80 and a light source 68, a reflective polarizer mirror 82, a display 84, a cold mirror 86, and an aspheric mirror 88 that are housed inside the housing 80. The cold mirror 86 is essentially a color filter that is used to selectively pass IR light and reflect light of the visible range. The cold mirror 86 could be made by applying a commercially available film to a piece of glass or an optically clear plastic or with multi-layer dielectric coatings. The aspheric mirror 88 may be provided to help focus and magnify the output image 42 just prior to projecting the output image 42 onto the windshield 16.

As shown in FIG. 6A, the output image 42 outputted by the light source 68 may travel through the reflective polarizer mirror 82 and the display 84, which acts as a filter, reflect off the cold mirror 86, and then reflect off the aspheric mirror 88 prior to being projected onto the windshield 16. As shown in FIG. 6B, a solar load SL experienced by the internal components of the projector assembly 48 is reduced due to the proposed design of the projector assembly 48. A majority of the solar load SL is reflected by the windshield 16, and a majority of the light L that passes through the windshield 16 is reflected off the aspheric mirror 88 and is then filtered by the cold mirror 86 to prevent projector component overheating.

Figure 7A:
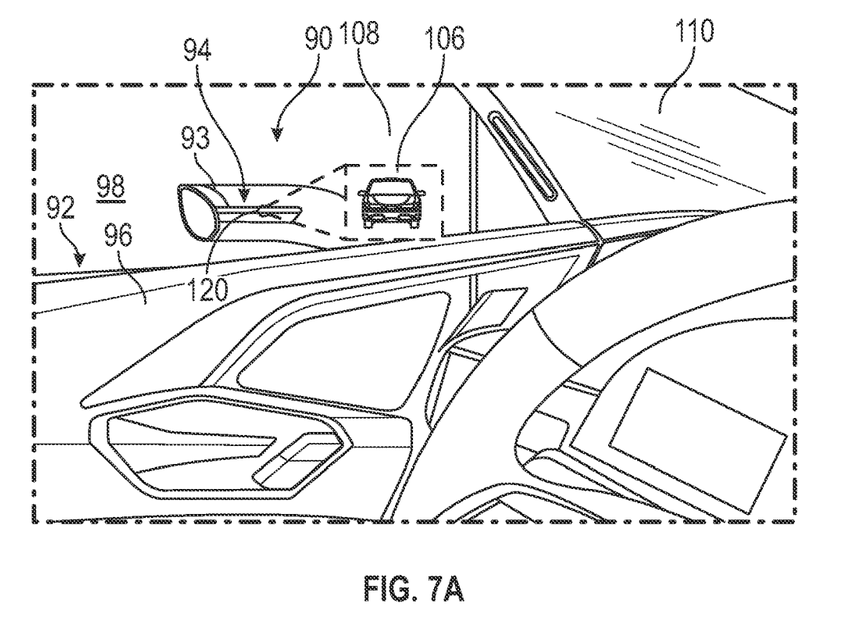
FIGS. 7A and 7B illustrate another exemplary exterior imaging system for a vehicle.
Figure 7B:
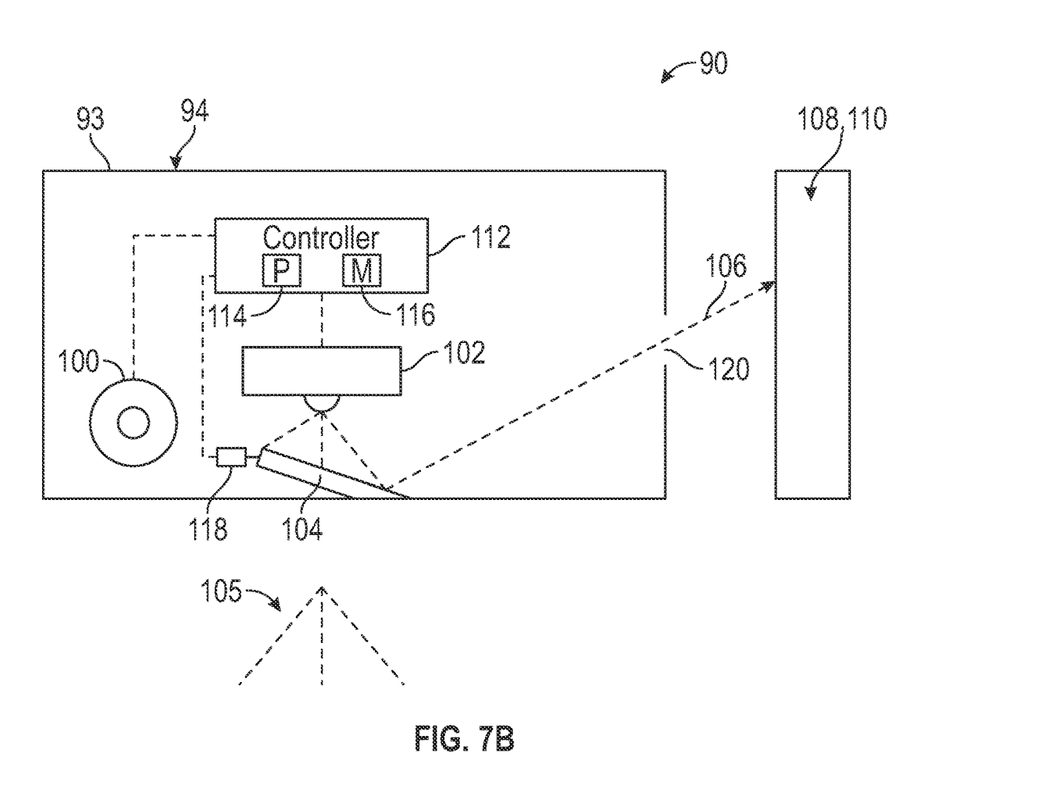

FIGS. 7A and 7B illustrate another exemplary exterior imaging system 90 for a vehicle 92. The exterior imaging system 90 may include an exterior side-view imager assembly 94 that is mounted to a door 96 of the vehicle 92 and is configured for capturing and displaying images associated with an exterior environment 98 about the vehicle 92. Although only a single exterior side-view imager assembly 94 is illustrated in FIG. 7A, the vehicle 92 could include an additional exterior side-view assembly mounted on an opposite side door of the vehicle 92.

The exterior side-view imager assembly 94 may include a housing 93 that is mounted to the door 96. As best shown in FIG. 7B, a camera 100, a projector assembly 102, and a mirror 104 may be housed inside the housing 93.

The camera 100 is capable of capturing the images of the exterior environment 98. The projector assembly 102 may serve a dual purpose. For example, the projector assembly 102 may be configured to act as a puddle lamp for projecting an illuminated pattern 105 onto a ground surface adjacent the vehicle 92. In addition, the projector assembly 102 may be configured to project output images 106 onto either a window 108 of the door 96 or a windshield 110 of the vehicle 92. The output images 106 provide a real-time view of the exterior environment 98 during operation of the vehicle 92 and are based on the images captured by the camera 100. The window 108 and/or the windshield 110 may include a combiner film similar to the one described above with respect to FIG. 5 in order to more clearly display the output images 106.

Referring now primary to FIG. 7B, a controller 112 may be in electrical communication with the various components of the exterior imaging system 90. The controller 112 may include a processing unit 114 and non-transitory memory 116 for executing the various control strategies and modes of the exterior imaging system 90. The processing unit 114, in an embodiment, is configured to execute one or more programs stored in the memory 116.

A first exemplary program, when executed, may be employed to command the projector assembly 102 to project an illuminated pattern 105 onto a ground surface adjacent the vehicle 92. This may be done, for example, when the vehicle 92 is OFF and an authorized user is approaching the vehicle 92.

A second exemplary program, when executed, may be employed to process the image data received from the camera 100. This processing may include, for example, cropping the images so that only a pertinent part of the images are projected onto the window 108/windshield 110.

A third exemplary program, when executed, may be employed by the controller 112 in order to command the projector assembly 102 to project the output images 106 onto the window 108/windshield 110. This may be done, for example, when the vehicle 92 is ON and traveling along a road surface.

Prior to commanding the projector assembly 102 to project the output images 106, the controller 112 may command a solenoid 118 to move the mirror 104 into position to reflect light projected by the projector assembly 102. The light projected by the projector assembly 102 will reflect off of the mirror 104 in order to direct the output images 106 through an opening 120 of the housing 93 and then onto the window 108/windshield 110. The mirror 104 and solenoid 118 may be required in situations where the projector assembly 102 has the additional function as a puddle lamp and is therefore oriented toward the ground surface rather than toward the surface upon which it is desirable to project the output images 106.

The vehicle exterior imaging systems of this disclosure provide relatively low cost options for capturing and displaying views of the exterior environment to vehicle operators during vehicle operation. The images output by the disclosed systems substantially eliminate the need for vehicle operators to glance from side-to-side, thus enabling the operators to keep their eyes focused more straight ahead on the road. The output images are further projected onto areas of the vehicle that will not be blocked by other passengers.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

I should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle exterior imaging system, comprising:
   a glass panel including a combiner positioned between a first layer of glass and a second layer of glass;
   a first exterior side-view imager assembly mounted external to a vehicle passenger cabin and configured to capture images of a vehicle exterior environment; and
   a projector assembly mounted inside a housing of the first exterior side-view imager assembly and being configured to project an output image onto the glass panel during a first vehicle condition and to project an illuminated pattern onto a ground surface during a second vehicle condition,
   wherein the output image is based on the images captured by the first exterior side-view imager assembly.

2. The system as recited in claim 1, wherein the glass panel is part of a windshield.

3. The system as recited in claim 1, wherein the glass panel is part of a window of a vehicle door.

4. The system as recited in claim 1, wherein the combiner includes at least one layer of a combiner film that is sandwiched between a first and a second layer of polyvinyl butyral (PVB).

5. The system as recited in claim 1, wherein the first exterior side-view imager assembly is a driver-side imager that includes a first camera for capturing the images.

6. The system as recited in claim 5, comprising a second exterior side-view imager assembly that is a passenger-side imager that includes a second camera for capturing additional images of the vehicle exterior environment.

7. The system as recited in claim 5, wherein the first camera and the projector assembly are mounted within a common housing of the first exterior side-view imager assembly.

8. The system as recited in claim 1, wherein the first exterior side-view imager assembly is mounted to a vehicle door.

9. The system as recited in claim 1, wherein the first exterior side-view imager assembly is mounted forward of a vehicle A-pillar.

10. The system as recited in claim 1, comprising a mirror movably mounted inside the housing and configured to reflect light emitted from the projector assembly so that the light passes through an opening of the housing and then onto the glass panel.

11. The system as recited in claim 10, comprising a solenoid configured to selectively move the mirror for reflecting the light.

12. The system as recited in claim 1, wherein the output image is projected onto a lower corner section of the glass panel at a location that is inboard of a vehicle A-pillar.

13. The system as recited in claim 1, comprising a controller configured to receive the images captured by the first exterior side-view imager assembly and then process the images to create the output image.

14. The system as recited in claim 13, wherein the controller is configured to command a light source of the projector assembly to project the output image onto the glass panel.

15. The system as recited in claim 13, wherein the controller is configured to adjust a brightness of the output image based on an ambient light level sensed by a sensor system.

16. The system as recited in claim 1, wherein the projector assembly is configured to function as a puddle lamp during the second vehicle condition.

17. The system as recited in claim 1, wherein the second vehicle condition is when a vehicle comprising the vehicle exterior imaging system is OFF and an authorized user is approaching the vehicle.

18. The system as recited in claim 1, wherein the first vehicle condition is when a vehicle comprising the vehicle exterior imaging system is ON and is traveling on a road surface.

19. The system as recited in claim 13, wherein the controller is configured to crop the images captured by the first exterior side-view imager assembly prior to creating the output image so that only a pertinent part of the images is projected onto the glass panel.

20. A vehicle exterior imaging system, comprising:
a vehicle door including a glass panel having a combiner;
a first exterior side-view imager assembly mounted to the vehicle door and configured to capture images associated with a vehicle exterior environment, wherein the first exterior side-view imager assembly includes a housing and a projector assembly mounted inside the housing; and
the projector assembly is configured to both (1) project an output image onto the glass panel of the vehicle door when a vehicle comprising the vehicle exterior imaging system is ON and is traveling on a road surface, and (2) project an illuminated pattern onto a ground surface when the vehicle is OFF and an authorized user is approaching the vehicle.

* * * * *